United States Patent [19]

Simon

[11] Patent Number: 5,512,386
[45] Date of Patent: Apr. 30, 1996

[54] LIQUID CATHODE LITHIUM CELL

[75] Inventor: Bernard Simon, Paris, France

[73] Assignee: Alcatel Alsthom Compagnie Generale d'Electricite, Paris, France

[21] Appl. No.: 93,919

[22] Filed: Jul. 21, 1993

[30] Foreign Application Priority Data

Jul. 23, 1992 [FR] France .................................... 92 09088

[51] Int. Cl.⁶ .............................. H01M 6/14; H01M 4/36
[52] U.S. Cl. ......................... 429/105; 429/196; 429/207; 429/217
[58] Field of Search ..................... 429/105, 196, 429/217, 218, 206, 207

[56] References Cited

U.S. PATENT DOCUMENTS

| | | |
|---|---|---|
| 4,495,266 | 1/1985 | Klinedinst et al. . |
| 4,499,160 | 2/1985 | Baba et al. .............................. 429/101 |
| 4,767,683 | 8/1988 | Yamada et al. ..................... 429/105 X |

FOREIGN PATENT DOCUMENTS

| | | |
|---|---|---|
| 0131822 | 1/1985 | European Pat. Off. . |
| 2263115 | 7/1973 | Germany . |
| 3122080 | 3/1982 | Germany . |
| 2108312 | 5/1983 | United Kingdom . |

OTHER PUBLICATIONS

V. S. Bogotzky et al., "Macrokinetic Study of Thionyl Chloride Reduction on Porous Carbon Electrodes" Journal of Power Sources, vol. 26, No. 3/4 May 16, 1989 pp. 427–433.

French Search Report FR 9209088—Apr. 8, 1993.

*Primary Examiner*—John S. Maples
*Attorney, Agent, or Firm*—Sughrue, Mion, Zinn, Macpeak & Seas

[57] ABSTRACT

The present invention provides a liquid cathode lithium cell including an electrolyte and a carbon-based electrode, said cell being characterized by the fact that said electrode is composed of a mixture of a carbon-containing material and of a binder to which an electroactive compound is added, said electroactive compound being more oxidizing than said electrolyte and having a reduction potential that is greater than 3 volts measured relative to a lithium electrode, the proportion of said electroactive compound lying in the range 10% to 80% by weight of said mixture.

10 Claims, 1 Drawing Sheet

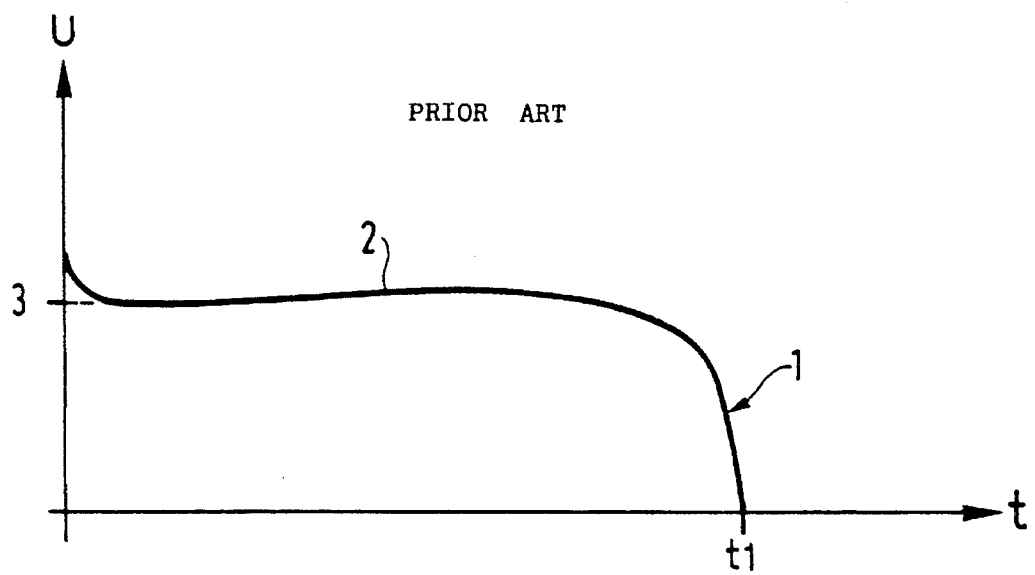
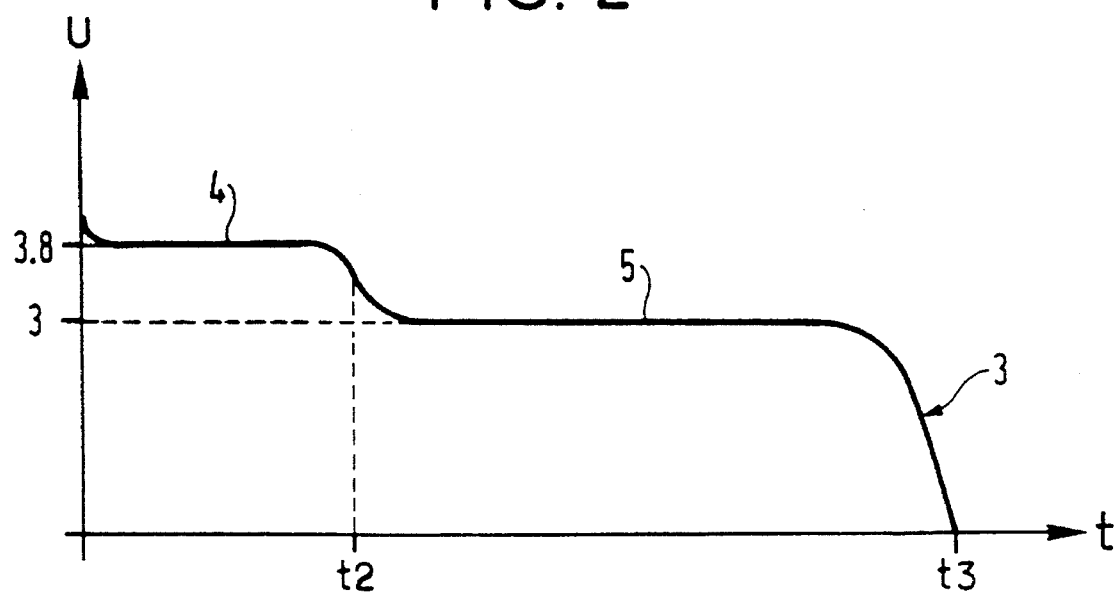

LIQUID CATHODE LITHIUM CELL

The invention relates to a liquid cathode lithium cell including a carbon electrode on which the electrolyte is reduced during discharge.

This type of "liquid cathode" lithium cell constitutes a primary cell having high energy density and high power density. Unlike a conventional cell, in which the two electrodes are separated by the inert electrolyte, the oxidizer is the electrolyte itself which is in direct contact with the lithium anode; the other electrode acts as a current collector and as a reaction site. During reduction of the electrolyte ($SOCl_2$, $SO_2Cl_2$, $SO_2+LiAlCl_4$, etc.), the reaction products (LiCl, etc.) precipitate at the surface of the positive electrode, thereby clogging it, and reducing its life span.

Therefore, with a view to delaying such clogging as much as possible, researchers have been working on two important parameters: namely, the specific surface area of the electrode and the porosity thereof.

Use of carbon blacks of very large specific surface area makes it possible to obtain high discharge capacities because the reaction products are distributed over a large surface area. However, there is a theoretical limit to the active surface area that is accessible. Moreover, problems arise with shaping the electrode and providing it with mechanical strength when its specific surface area is large, i.e. over 500 $m^2/g$. Since most existing carbon blacks have already been tested, little progress can be expected from such compounds.

Use of the entire available inside volume depends on controlling deposition of the reaction products. It is related to pore volume and to pore distribution.

Modifying the physical properties of the electrode by adding nickel carbonyl has been tried without there being any improvement in performance levels (Proc. Mat. and Process for Li Batt., 1989).

By adding expanding agents, such as $(NH_4)_2CO_3$, and $NH_4HCO_3$ (J. Electrochem. Soc., 132 (1985) 2044), it is possible to improve the accessibility of the inside pore volume, in particular at high current densities. But their effect is limited by the intrinsic characteristics of the carbon used.

Carbon black also has a catalytic effect related to its specific activity and to its inside surface area. That effect can be enhanced by adding a finely dispersed metal.

U.S. Pat. Nos. 4,167,608 and 4,262,065 each describe an $Li/SOCl_2$ cell with a carbon current collector in which finely divided copper is dispersed. The copper is included so as to lower impedance, and to reduce the risks of explosion due to the elemental sulfur reacting with the lithium. Adding iron in powder form (FR-2 539 250), nickel, cobalt, manganese, chromium (U.S. Pat. No. 4,264,687), and dispersed platinum (U.S. Pat. No. 4,272,593) is also suggested. But capacity is improved only at low current densities. Furthermore, those metals react with the electrolyte to form non-conductive products, such as chlorides, which clog the cathode, or products that are soluble in the electrolyte and that corrode the anode.

Other additives, such as transition metal halides have also been considered.

Electrodes containing metal chalcogenides, oxyhalides, or halides, and 10% to 12% carbon, are suggested in Patent GB-2 142 469.

A cathode composed of $CuCl_2$ (60% to 80%) and of carbon (10% to 30%) is described in U.S. Pat. No. 4,515, 875. An oxidation-reduction reaction $CuCl \leftrightarrows CuCl_2$ takes place quickly, and at a potential that is higher than the precipitation of LiCl, but the chlorides formed dissolve progressively in the electrolyte, in particular if the temperature rises during discharge.

Finally, carbons modified by surface treatment are described in U.S. Pat. No. 4,835,074; a covalent bond is set up between the pre-oxidized carbon and a nitrogen-containing functional group, which bond makes it possible to improve performance levels by about 5%, which is still a small improvement.

An object of the present invention is to increase the energy per unit volume of liquid cathode lithium cells, by increasing mean voltage, and by increasing discharged capacity. In order to increase capacity, the discharge duration must be extended by delaying clogging of the electrode.

The present invention provides a liquid cathode lithium cell including an electrolyte and a carbon-based electrode. The carbon-based electrode is composed of a mixture of a carbon-containing material and of a binder to which an electroactive compound is added, said electroactive compound being more oxidizing than said electrolyte and having a reduction potential that is greater than 3 volts measured relative to a lithium electrode, the proportion of said electroactive compound lying in the range 10% to 80% by weight of said mixture.

The carbon-containing material gives a large specific surface area to the electrode, and the binder gives the electrode its cohesion. A compound that is more oxidizing than the "liquid cathode" is added to them. The compound reduces at a potential that is greater than that of the electrolyte, e.g. by intercalating cations in its structure. Adding said electroactive material also enables the pores of the electrode to be opened by means of the presence of grains of electroactive material of diameter (e.g. 10 µm) that is much greater than that of the grains of the carbon-containing material with which it is mixed (e.g. 1 µm).

In an embodiment of the invention, the electroactive compound is chosen from non-lithium-containing oxides of transition metals, lithium-containing oxides of transition metals, and mixtures thereof. It is chosen, in particular, from lithium-containing and non-lithium containing oxides of cobalt, of nickel, of manganese, of vanadium, of chromium, of titanium, and mixtures thereof having reduction potentials that are greater than 3 V/Li, such as $CoO_2$, $NiO_2$, $MnO_2$, $Mn_2O_4$, $V_2O_5$, $Cr_3O_8$, $TiO_2$, and others, and preferably from lithium-containing oxides (x<1) of nickel $Li_xNiO_2$, of cobalt $Li_xCoO_2$, of manganese $Li_xMnO_2$, and mixtures thereof.

In another embodiment of the invention, the electroactive compound is chosen from intercalation sulfides, and mixtures thereof, such as $MoS_2$, $MoS_3$, $TiS_2$, $TiS_3$, $NIPS_2$, $NIPS_3$, $TaS_2$, $TaS_3$, $NbS_3$, $WS_3$, and others having reduction potentials that are greater than 3 V/Li.

In another embodiment of the invention, the electroactive compound is chosen from conductive polymers and redox polymers, the reduction potentials of the polymers being greater than 3 V/Li.

In another embodiment of the invention, the carbon-containing material is chosen from carbon blacks of large specific surface area (50 $m^2/g$ to 1,500 $m^2/g$), and mixtures thereof.

The presence of the electroactive material facilitates shaping of the electrode compared with an electrode that contains only the mixture of carbon-containing material and of binder.

In another embodiment of the invention, the binder is chosen from fluoride-containing polymers, such as PTFE, PVDF, etc, elastomers, and mixtures thereof. The concentration of the binder lies in the range 2% to 30% by weight of said mixture.

The electrolyte is composed of a conventional "liquid cathode" containing a solvent such as thionyl chloride $SOCl_2$, sulfuryl chloride $SO_2Cl_2$, and others, and an alkaline or alkaline-earth cation salt, such as $LiAlCl_4$, $LiGaAlCl_4$, $LiGaCl_4$, $LiSbS_6$, $LiSbCl_6$, $Li_3SbCl_6$, $LiTaCl_6$, $LiNbCl_6$, $LiInCl_4$, $Li_2B_{10}Cl_{10}$, $Li_2B_{12}Cl_{12}$, and others. The liquid cathode may also be the solvates $LiAlCl_4/3\ SO_2$, or $LiAlCl_4/6\ SO_2$.

Other characteristics and advantages of the present invention will appear on reading the following examples given by way of non-limiting example and with reference to the accompanying drawing, in which:

BRIEF DESCRIPTION OF THE DRAWING

FIG. 1 shows the discharge curve of a prior art cell; and

FIG. 2 shows the discharge curve of a cell of the invention.

In both figures, U is the voltage of the cell in volts, and t is the discharge time.

EXAMPLE 1 Prior Art

An electrode was made using a mixture of 90% carbon black of specific surface area of about 1,000 $m^2/g$ (Ketjenblack 600) and of 10% PTFE. The mixture was deposited on a metal support, e.g. a grid or an expanded-metal screen. The thickness of the electrode was 0.15 mm. A cell was assembled that included a lithium anode, an $LiAlCl_4/3\ SO_2$ electrolyte, and the carbon electrode.

A conventional $LiAlCl_4/3\ SO_2$ cell has a discharge curve 1 (shown in FIG. 1) that includes a voltage plateau 2 which is situated at about 3.0 V, during which the liquid cathode is reduced by a reaction mechanism resulting either in $Li_2S_2O_4$ by means of the reaction: $2\ Li^+ + 2\ SO_2 = 2\ e^- \rightarrow Li_2S_2O_4$, or else in a lithium complex formed with the carbon. In both cases, this results in the pores becoming clogged quickly, and the end of the discharge takes place at the end of a lapse of time $t_1$.

Constant-current discharge at a current of 2 $mA/cm^2$ makes it possible to obtain a capacity of 12 $mAh/cm^2$;

EXAMPLE 2

In the same way as in example 1, an electrode of the same thickness was made from a mixture of 75% lithium-containing cobalt oxide $Li_xCoO_2$, of 15% carbon black (Ketjenblack 600), and of 10% PTFE, and it was assembled in a cell.

FIG. 2 shows a discharge curve 3 of an $LiAlCl_4/3\ SO_2$ cell of the invention. The electroactive compound was lithium-containing cobalt oxide $Li_xCoO_2$. A first voltage plateau 4 at about 3.8 V was due to the electroactive compound being reduced with lithium ions being intercalated during time $t_2$. Then a second plateau 5 at about 3.0 V corresponds to conventional discharge. The total duration of the discharge $t_3$ was greater than the duration of a conventional discharge $t_1$.

During a test conducted under the same conditions as in example 1, the cell yielded 17 $mAh/cm^2$.

EXAMPLE 3

Example 1 was reproduced but the electrode was made from a mixture of 50% lithium-containing cobalt oxide $Li_xCoO_2$, of 40% carbon black of large surface area (1,000 $m^2/g$), and of 10% PTFE.

The capacity discharged under the same conditions as in example 1 was then 20 $mAh/cm^2$.

Naturally, the present invention is not limited to the embodiments described and shown. Many variants on the invention that are accessible to a person skilled in the art are possible without going beyond the spirit of the invention. In particular, any means may be replaced with equivalent means without going beyond the ambit of the invention.

I claim:

1. A liquid cathode lithium cell including an electrolyte and a carbon-based electrode, wherein said electrode is composed of a mixture of a carbon-containing material and of a binder to which an electroactive compound is added, said electroactive compound being more oxidizing than said electrolyte and having a reduction potential that is greater than 3 volts measured relative to a lithium electrode, the proportion of said electroactive compound lying in the range 10% to 80% by weight of said mixture.

2. A lithium cell according to claim 1, wherein that said electroactive compound is chosen from non-lithium-containing oxides of transition metals, lithium-containing oxides of transition metals, and mixtures thereof.

3. A lithium cell according to claim 1, wherein that said electroactive compound is chosen from lithium-containing and non-lithium containing oxides of cobalt, of nickel, of manganese, of vanadium, of chromium, of titanium, and mixtures thereof.

4. A lithium cell according to claim 1, wherein that said electroactive compound is chosen from intercalation sulfides, and mixtures thereof.

5. A lithium cell according to claim 1, wherein that said electroactive compound is chosen from conductive polymers and redox polymers.

6. A lithium cell according to claim 1, characterized by the fact that said carbon-containing material is chosen from carbon blacks of specific surface area lying in the range 50 $m^2/g$ to 1,500 $m^2/g$, and mixtures thereof.

7. A lithium cell according to claim 1, characterized by the fact that said binder is chosen from fluoride-containing polymers, elastomers, and mixtures thereof.

8. A lithium cell according to claim 1, characterized by the fact that the concentration of said binder lies in the range 2% to 30% by weight of said mixture.

9. A lithium cell according to claim 1, characterized by the fact that said electrolyte is composed of a "liquid cathode" containing an alkaline or alkaline-earth cation salt.

10. A liquid cathode lithium cell including an electrolyte and a carbon-based electrode, wherein said electrode is composed of a mixture of a carbon-containing material and of a binder to which an electroactive compound is added, said electroactive compound being more oxidizing than said electrolyte and having a reduction potential that is greater than 3 volts measured relative to a lithium electrode, the proportion of said electroactive compound lying in the range 10% to 80% by weight of said mixture, and said electroactive compound being chosen from the group consisting of lithium-containing oxides of nickel, of cobalt, of manganese, of vanadium, of chromium, of titanium, and mixtures thereof.

* * * * *